(12) United States Patent
Chung et al.

(10) Patent No.: US 9,497,143 B2
(45) Date of Patent: Nov. 15, 2016

(54) METHOD AND SYSTEM FOR PROVIDING ON-AIR SERVICE USING OFFICIAL ACCOUNT

(71) Applicant: LINE CORPORATION, Tokyo (JP)

(72) Inventors: Hyuk Chung, Seongnam-si (KR);
Ryuichi Kumai, Seongnam-si (KR);
Donghyun Kim, Seongnam-si (KR);
Minbo Bae, Seongnam-si (KR);
Youngsu Ko, Seongnam-si (KR);
Yusuke Katagiri, Seongnam-si (KR);
Teppei Daito, Seongnam-si (KR);
Yusuke Ota, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 598 days.

(21) Appl. No.: 13/855,556

(22) Filed: Apr. 2, 2013

(65) Prior Publication Data
US 2014/0032684 A1 Jan. 30, 2014

(30) Foreign Application Priority Data

Jul. 26, 2012 (KR) .................. 10-2012-0081524

(51) Int. Cl.
*G06F 15/16* (2006.01)
*H04L 12/58* (2006.01)
*H04L 12/18* (2006.01)

(52) U.S. Cl.
CPC ........... *H04L 51/04* (2013.01); *H04L 12/1822* (2013.01)

(58) Field of Classification Search
CPC ............................ H04L 12/581–12/582; H04L 12/1813–12/1831; H04L 51/00–51/04
See application file for complete search history.

(56) References Cited

U.S. PATENT DOCUMENTS

| 7,603,413 B1* | 10/2009 | Herold ................. G06Q 10/10 455/466 |
| 7,743,096 B2 | 6/2010 | Bouilloux-Lafont et al. |
| 2007/0168447 A1* | 7/2007 | Chen .................. G06Q 10/107 709/207 |
| 2007/0288560 A1* | 12/2007 | Bou-Ghannam .... G06Q 10/107 709/204 |

(Continued)

FOREIGN PATENT DOCUMENTS

| JP | 2002-109403 | 4/2002 |
| JP | 2003-271514 | 9/2003 |

(Continued)

OTHER PUBLICATIONS

Japan Press Release dated May 9, 2012; Published by NHN Corporation; Country of publication: Japan; http://about.naver.jp/press/press_detail?docId=1115.

(Continued)

*Primary Examiner* — Brendan Higa
(74) *Attorney, Agent, or Firm* — IPUSA, PLLC

(57) ABSTRACT

A method and a system for providing a messenger on-air service using an official account include providing an interface for creating and managing an event using an official account, and creating an event chat room in which a plurality of users sharing a relationship with an event creator participate based on a request of the event creator through the interface.

12 Claims, 17 Drawing Sheets

(56) References Cited

U.S. PATENT DOCUMENTS

| | | | | |
|---|---|---|---|---|
| 2011/0282706 | A1* | 11/2011 | Ezra | G06Q 10/063114 705/7.15 |
| 2013/0144961 | A1* | 6/2013 | Park | H04L 51/046 709/206 |
| 2013/0332540 | A1* | 12/2013 | Vadhavkar | H04L 51/04 709/206 |
| 2014/0122619 | A1* | 5/2014 | Duan | G06F 17/27 709/206 |

FOREIGN PATENT DOCUMENTS

| | | |
|---|---|---|
| JP | 2004-328791 | 11/2004 |
| JP | 2005-136524 | 5/2005 |
| JP | 2005-141697 | 6/2005 |
| JP | 2005-524302 | 8/2005 |
| JP | 2011-248838 | 12/2011 |
| JP | 2013-029922 | 2/2013 |
| KR | 10-2005-0114378 | 12/2005 |
| KR | 10-2011-0041694 | 4/2011 |

OTHER PUBLICATIONS

Japan LINE Application dated May 9, 2012; Published by NHN Corporation; Country of publication: Japan.
Japan Press Release dated Jun. 8, 2012; Published by NHN Corporation; Country of publication: Japan; http://www.nhncorp.jp/press/files/PRESS_20120608122558.pdf.
Japan LINE official blog post dated Jun. 8, 2012; Published by NHN Corporation; Country of publication: Japan; http://lineblog.naver.jp/archives/8396229.html.
Hong Kong Press Release dated Jun. 14, 2012; Published by NHN Corporation; Country of publication: Hong Kong.
Taiwan Press Release dated Jun. 14, 2012; Published by NHN Corporation; Country of publication: Taiwan.
Thailand Press Release dated Jun. 14, 2012; Published by NHN Corporation; Country of publication: Thailand.
Japan LINE Official Facebook Post dated Jul. 17, 2012; Published by NHN Corporation; Country of publication: Japan; http://www.facebook.com/LINEbyNAVER/posts/243029652482804.
Press Release Hong Kong (Chinese) dated Jul. 18, 2012; Published by NHN Corporation; Country of publication: Hong Kong.
Press Release Hong Kong (English) dated Jul. 18, 2012; Published by NHN Corporation; Country of publication: Hong Kong.
Taiwan Press Release dated Jul. 18, 2012; Published by NHN Corporation; Country of publication: Taiwan.
Japanese Office Action dated Jul. 2, 2013.
Japanese Office Action dated Nov. 26, 2013.
Naver Blog, "Shopping wisely using Plus Friend of KaKao talk", May 25, 2012. <URL: http://blog.naver.com/sdedy/50141959082>, with English Abstract.
Korean Office Action dated Feb. 29, 2016.

* cited by examiner

FIG. 10

| LINE OFFICIAL | | | | | |
|---|---|---|---|---|---|
| HOME | | | | | |
| BASIC SETUP | DATA STATISTICS ~1000 | | | | |
| DATA STATISTICS | | | SEARCH | INITIALIZE | |
| MESSAGE | | ~1001 | ~1002 | ~1003 | ~1004 |
| SEND ACCOUNT | DATE | PROMOTION DISPLAY | ADDED FRIEND | SENT MESSAGE | RECEIVED MESSAGE |
| ON-AIR MODE | 2012-07-12 | 0 | 0 | 0 | 0 |
| | 2012-07-11 | 0 | 0 | 0 | 0 |
| | 2012-07-10 | 0 | 1 | 1 | 1 |
| | 2012-07-09 | 0 | 4 | 8 | 8 |
| | 2012-07-08 | 0 | 0 | 0 | 0 |
| | 2012-07-07 | 0 | 1 | 0 | 0 |
| | 2012-07-06 | 0 | 0 | 0 | 0 |
| | 2012-07-05 | 0 | 1 | 0 | 0 |
| | 2012-07-04 | 0 | 0 | 0 | 0 |
| | 2012-07-03 | 0 | 0 | 0 | 0 |
| | 2012-07-02 | 0 | 0 | 0 | 0 |
| | 2012-07-01 | 0 | 0 | 0 | 0 |
| | TOTAL | 0 | 7 | 9 | 9 |

FIG. 14

| LINE OFFICIAL | | | | | | | |
|---|---|---|---|---|---|---|---|
| HOME | | | | | | | |
| BASIC SETUP | NEW BROADCAST 1401 | | | MESSAGE CONTENTS | | SEARCH | |
| DATA STATISTICS | | | | | | 1407 1408 | |
| MESSAGE | | 1402 | 1403 | 1404 | 1405 | 1406 | |
| SEND ACCOUNT | | | | | | | |
| ON-AIR MODE 1409 | | | | | | | |
| | NO | EVENT TITLE | TRANSMISSION NO. | RECEPTION NO. | WANTED PARTICIPANT NO. | PARTICIPANT NO. | START | FINISH |
| | 24 | LET'S START FAN MEETING! | 16 | 161899 | 1000 | 1563 | 2012. 03.18 17:53:25 | END |
| | 23 | LET'S START FAN MEETING! | 16 | 161899 | - | 165 | 2012. 03.18 17:53:25 | 2012. 03.18 19:53:25 |
| | 22 | LET'S START FAN MEETING! | 16 | 161899 | - | 145 | 2012. 03.18 17:53:25 | 2012. 03.18 19:53:25 |
| | 21 | LET'S START FAN MEETING! | 16 | 161899 | - | 165 | 2012. 03.18 17:53:25 | 2012. 03.18 19:53:25 |
| | 20 | LET'S START FAN MEETING! | 16 | 161899 | - | 145 | 2012. 03.18 17:53:25 | 2012. 03.18 19:53:25 |

1 | 2 | 3 | 4 | 5

METHOD AND SYSTEM FOR PROVIDING ON-AIR SERVICE USING OFFICIAL ACCOUNT

CROSS REFERENCE TO RELATED APPLICATION

This application claims priority from and the benefit of Korean Patent Application No. 10-2012-0081524, filed on Jul. 26, 2012, which is hereby incorporated by reference for all purposes as if fully set forth herein.

BACKGROUND OF THE INVENTION

1. Field of the Invention

Exemplary embodiments of the present invention relate to a communication tool providing a one-to-many message transmission and reception system.

2. Discussion of the Background

A messenger service is a software based communication tool for sending and receiving a message or data in real time, for enabling a user to register a chatting partner on the messenger, and for transmitting and receiving messages in real time with the chatting partner.

Such a messenger service is widely used in personal computers (PCs) as well as in mobile environments of portable communication terminals.

A conventional messenger service enables addition of a chatting partner to a communication list only when a user has information on the person, thereby supporting communications with a limited number of people and providing insufficient communication channels with various users.

Thus, there is a need for a system and a method for connecting any user using a messenger service through an official account.

The above information disclosed in this background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a method and a system for providing an on-air service which provides a participation event using an official account open to all users using a messenger.

Exemplary embodiments of the present invention also provide a method and a system for providing an on-air service which support a one-to-many message transmission and reception structure for a plurality of users participating in an event with an official account.

Additional features of the invention will be set forth in the description which follows, and in part will be apparent from the description, or may be learned by practice of the invention.

Exemplary embodiments of the present invention disclose a method that uses a processor for providing a messenger on-air service, the method includes providing, to an event creator, an interface to generate and manage an event using an official account. The method may further include generating, through the interface and using the processor, an event chat room for a plurality of users based on a request of the event creator, and transmitting and receiving data for the event creator through the event chat room. The method further includes generating the event chat room including generating a separate chat room for each of the plurality of users.

Exemplary embodiments of the present invention disclose a system for providing a messenger on-air service, the system including an interfacer configured to provide, to an event creator, an event management service to generate and manage an event using an official account. The system further includes a chat room generator configured to generate an event chat room for a plurality of users based on a request of the event creator. The system may also include a data transmitter and receiver configured to transmit and receive data for the event creator through the event chat room. The chat room generator may be configured to create a separate chat room for each of the plurality of users.

Exemplary embodiments of the present invention also disclose a non-transitory computer-readable recording medium comprising instructions, which when executed by a computer system, perform a method including providing, to an event creator, an interface to create and manage an event using an official account. The method may further include generating, through the interface, an event chat room for a plurality of users based on a request of the event creator, and transmitting and receiving data for the event creator through the event chat room. The method further includes generating the event chat room including generating a separate chat room for each of the plurality of users.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9, FIG. 10, FIG. 11, FIG. 12, FIG. 13, FIG. 14, FIG. 15, and FIG. 16 are screens illustrating interfaces provided to an event creator to generate and manage an event according to exemplary embodiments of the present invention.

DETAILED DESCRIPTION OF THE ILLUSTRATED EMBODIMENTS

Figure 1:
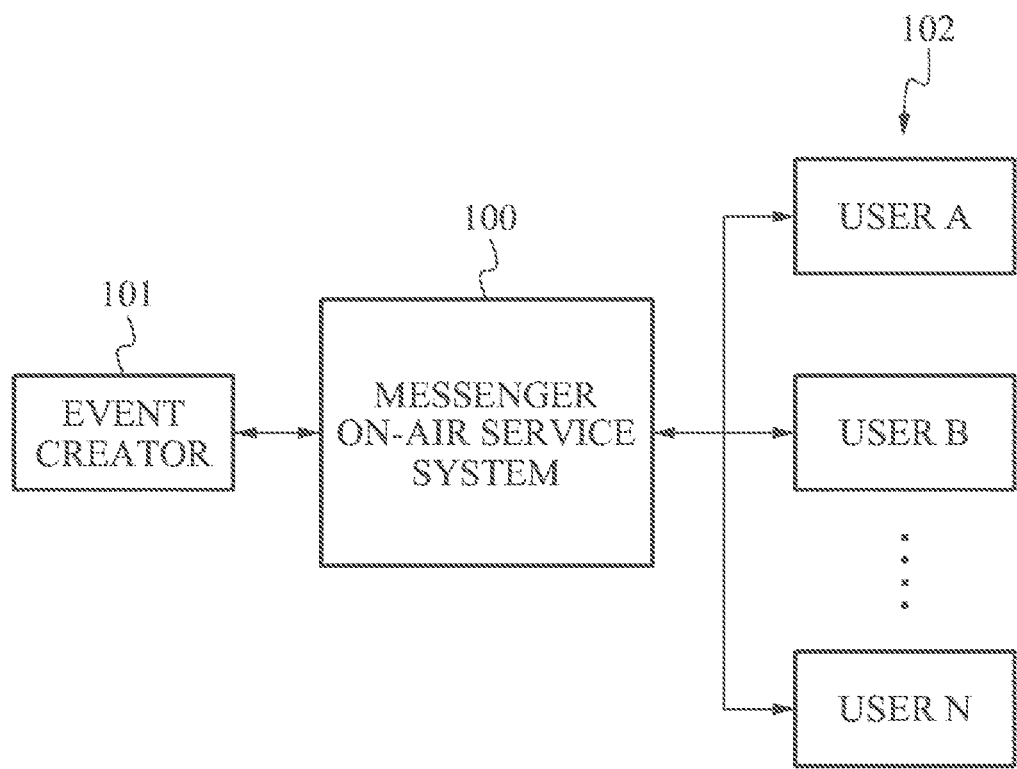
FIG. 1 schematically illustrates relationships between a messenger on-air service system, an event creator, and users according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Those skilled in the art would realize the described exemplary embodiments may be modified in various different ways, all without departing from the spirit or scope of the present invention.

It will be understood that when an element is referred to as being "connected to" another element, it can be directly connected to the other element, or intervening elements may be present.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

A chat room may be generated for a user participation event in a communication tool (hereinafter, referred to as a "messenger") to provide a one-to-n (where n is any whole number greater than or equal to one) message transmission and reception system, and also to provide an event creator with an interface for managing the chat room.

The term "official account" refers to an account in a bot form to provide various types of services and information associated with, for example, artists, celebrities, brands, business, and media, and the like on a messenger and may be open or recommended to all users using the messenger. Further, the "official account" may denote an account to be automatically recommended to a user using the messenger according to predetermined requirements and added by the user as a chatting partner. For example, the "official account" may include an account recommended to users who satisfy demonstration requirements, such as an age or a gender, or an account recommended to users who input a code obtained through various online or offline paths. The term "event creator" may refer to an administrator to provide various types of information associated with artists, celebrities, brands, business, and media using the official account and an agent to create and manage an event.

FIG. 1 schematically illustrates relationships between a messenger on-air service system 100, an event creator 101, and users 102 according to exemplary embodiments of the present invention.

Referring to FIG. 1, a plurality of users A, B, to N 102 may be connected to the messenger on-air service system 100 and the event creator 101. The event creator 101 and the users 102 may refer to terminals, such as smart phones, tablet personal computers (PCs), digital televisions or PCs used by the event creator 101 and the users 102, respectively. In FIG. 1, arrows indicate data is being transmitted and received using a wire-based or wireless network between a terminal of the event creator 101, the messenger on-air service system 100 and terminals of the users 102.

The messenger on-air service system 100 may refer to a messenger server enabling transmission and reception of a message or data in real time between terminals having a messenger application installed. It can be appreciated that the messenger server may be any combination of hardware and software elements configured to support the communications with the event creator 101 and the users 102. The messenger on-air service system 100 may support a one-to-n message transmission and reception structure between the event creator 101 and the plurality of users 102. The messenger on-air service system 100 may provide the event creator 101 with a plurality of channels to send a message to the plurality of users 102 in some cases, simultaneously, and, in some cases, according to a pre-determined order, and provide each of the users 102 with a single channel to send a message to the event creator 101. Furthermore, the messenger on-air service system 100 serves as a contents management system (CMS), thereby providing the event creator 101 with a management service for creation of an event and general management of an account. The aforementioned services may be supported not only in a mobile environment but in a PC environment. The service for creation of an event and general management of an account may be supported in a website connected environment.

Figure 2:
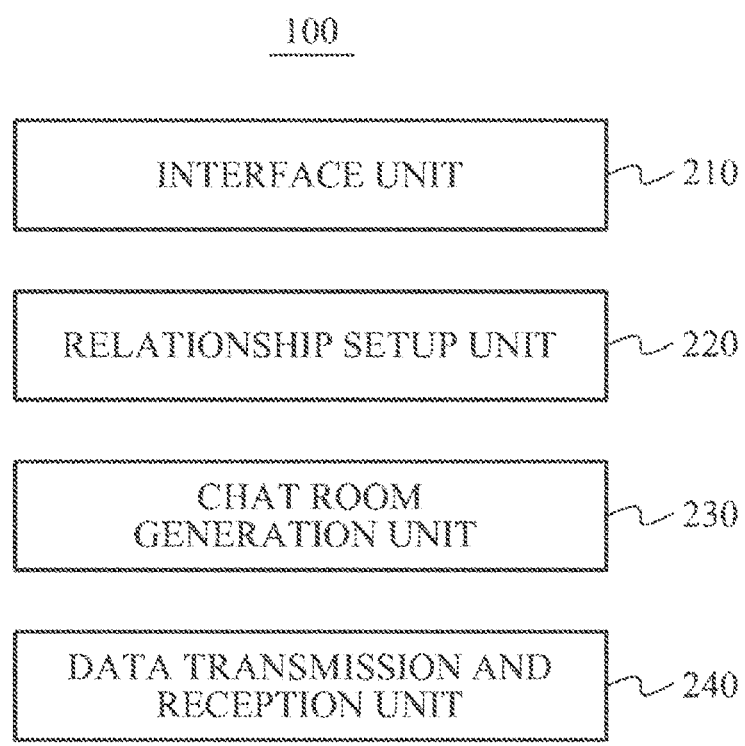
FIG. 2 is a block diagram illustrating a configuration of a messenger on-air service system generating and managing an event for a plurality of users according to exemplary embodiments of the present invention.

FIG. 2 is a block diagram illustrating a configuration of the messenger on-air service system 100 to generate and manage an event for a plurality of users according to exemplary embodiments of the present invention. As shown in FIG. 2, the messenger on-air service system 100 according to the exemplary embodiments of the present invention may include an interface unit 210, a relationship setup unit 220, a chat room generation unit 230, and a data transmission and reception unit 240.

The interface unit 210 may serve not only as an interface with a user 102 using a private account but also as an interface for an event creator 101 using an official account. The interface for the user 102 may be provided in a bot form in a messenger platform of a terminal, and the interface for the event creator 101 may be supported in a smart phone application and/or a separate website connected environment, and functions of the website connected environment may be provided in a bot form in the messenger platform of a terminal. Functions of the interface unit 210 will be described in detail with reference to FIG. 5, FIG. 6, FIG. 7, FIG. 8, FIG. 9, FIG. 10, FIG. 11, FIG. 12, FIG. 13, FIG. 14, FIG. 15, and FIG. 16.

The relationship setup unit 220 may establish a relationship between the event creator 101 and the user 102. The relationship setup unit 220 may register the official account selected by the event creator 101, on a friend list of the user 102, and may also register the private account of the user 102 as a friend of the event creator 101.

The chat room generation unit 230 may create an event chat room, which a plurality of users 102 establishing a relationship with the official account of the event creator 101 participate in, based on a request of the event creator 101. The event creator 101 may set up a new event through the interface unit 210, and accordingly the chat room generation unit 230 may create an event chat room with the event creator 101 and the users 102 designated as chatting partners and/or friends so that the users 102 registered as friends participate in the new event. The chat room generation unit 230 may create and maintain an independent chat room for each user 102 registered with the event creator 101 as a friend. Although an event message written by the event creator 101 may be transmitted to the plurality of users 102, the users 102 may have a chat with the event creator 101 in a separate space of each user 102, not in a single communal room. Further, the chat room generation unit 230 may maintain an on-air mode, in which data transmission and reception is enabled in the created event chat room, for a predetermined period of time. The on-air mode may be maintained for a predetermined period of time, for example, 24 hours, set automatically at a time when the event may be created or set by the event creator 101, or an on-air event may be forcibly terminated by the event creator 101 within the predetermined period of time when desired by the event creator 101.

Figure 3:
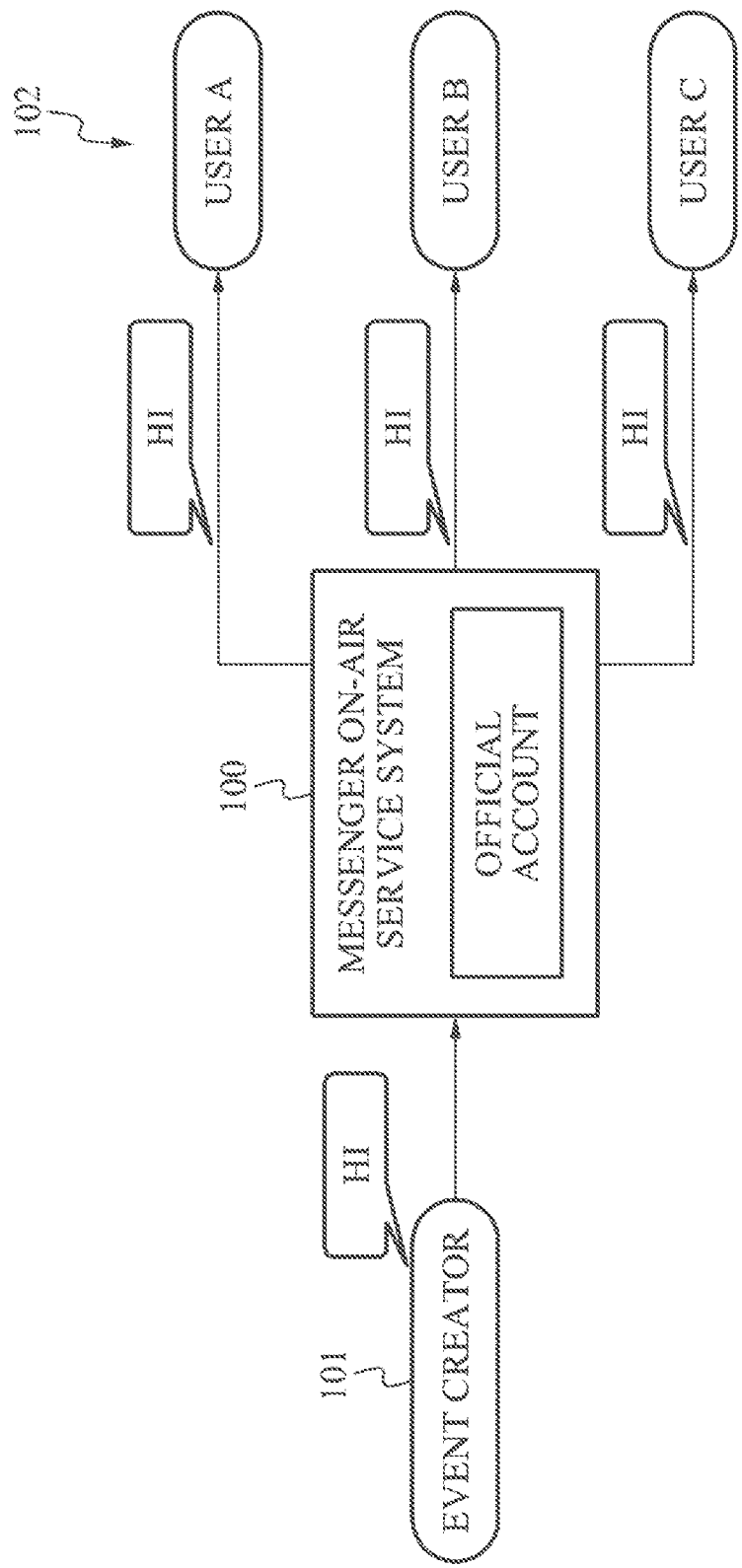
FIG. 3 and FIG. 4 are diagrams illustrating a message transmission and reception system between an event creator and users according to exemplary embodiments of the present invention.
Figure 4:
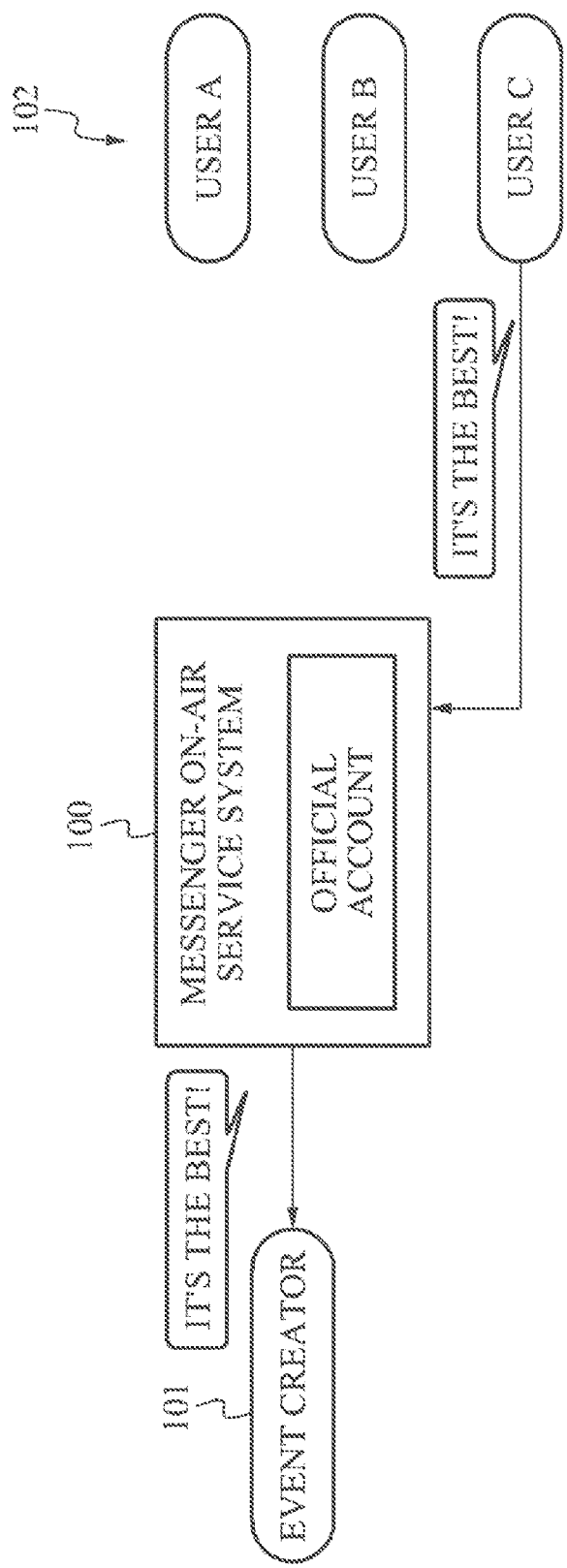

The data transmission and reception unit 240 may serve to transmit and receive data between the event creator 101 and the plurality of users 102 through the created event chat room based on a request of the event creator 101. The data transmission and reception unit 240 may send data in various forms, such as a text message, an image, a stamp, a pictograph, a video, and/or a sound, between the event creator 101 and the users 102 participating in the event chat room. The data transmission and reception unit 240 may provide a plurality of channels when the event creator 101 transmits the data to a plurality of users 102 as illustrated in FIG. 3, and the data transmission and reception unit 240 may provide a single channel when a user 102 (e.g., USER C) transmits data to the event creator 101 as illustrated in FIG. 4. As shown in FIG. 3, data sent by the event creator 101 may be transmitted to all users 102 participating in the event chat room at a time through the plurality of channels provided by the messenger on-air service system 100. As shown in FIG. 4, data sent by USER C is transmitted only to the event creator 101 through the single channel provided by the messenger on-air service system 100, and not to the other users. Such a data transmission and reception system may be realized since an independent chat room is generated and managed with respect to each of the users 102 participating in the event chat room.

Accordingly, although a chat room for a participation event with an official account is created by the messenger on air service system 100 to transmit an event message to a plurality of users 102, an independent chat room may be generated and managed for each user 102 to have a chat in a separate space, instead of the event creator 101 and the users 102 having a chat in a single community chat room.

Hereinafter, the functions of the interface unit 210 will be described in detail.

The interface unit 210 may provide the user 102 using a private account with an interface for friend management and may provide the event creator 101 using the official account with an interface for event generation and management. When an event with the official account is initiated, the event creator 101 may be provided with a general management service to manage a plurality of chat rooms. For example, an independent event chat room may be generated and managed for each user 102. The event creator 101 may specify an event and check a transmission and reception message with the users 102 through the management service provided in an interface environment of the messenger on-air service system 100.

User interface (UI) screens to be described hereinafter may have different screen configurations or functions based on operating systems or UI environments of terminals. General messenger display configurations of a smart phone, a tablet PC, a digital television or a PC are illustrated in FIG. 5, FIG. 6, FIG. 7, and FIG. 8. However, UI screens may not be limited to the illustrated exemplary embodiments, and the detailed description, configurations or functions of the UI screens may be changed variously.

First, an interface function for a user will be described with reference to FIG. 5, FIG. 6, FIG. 7, and FIG. 8.

FIG. 5, FIG. 6, FIG. 7, and FIG. 8 are UI screens of users 102 participating in an event with an official account according to exemplary embodiments of the present invention.

Figure 5:
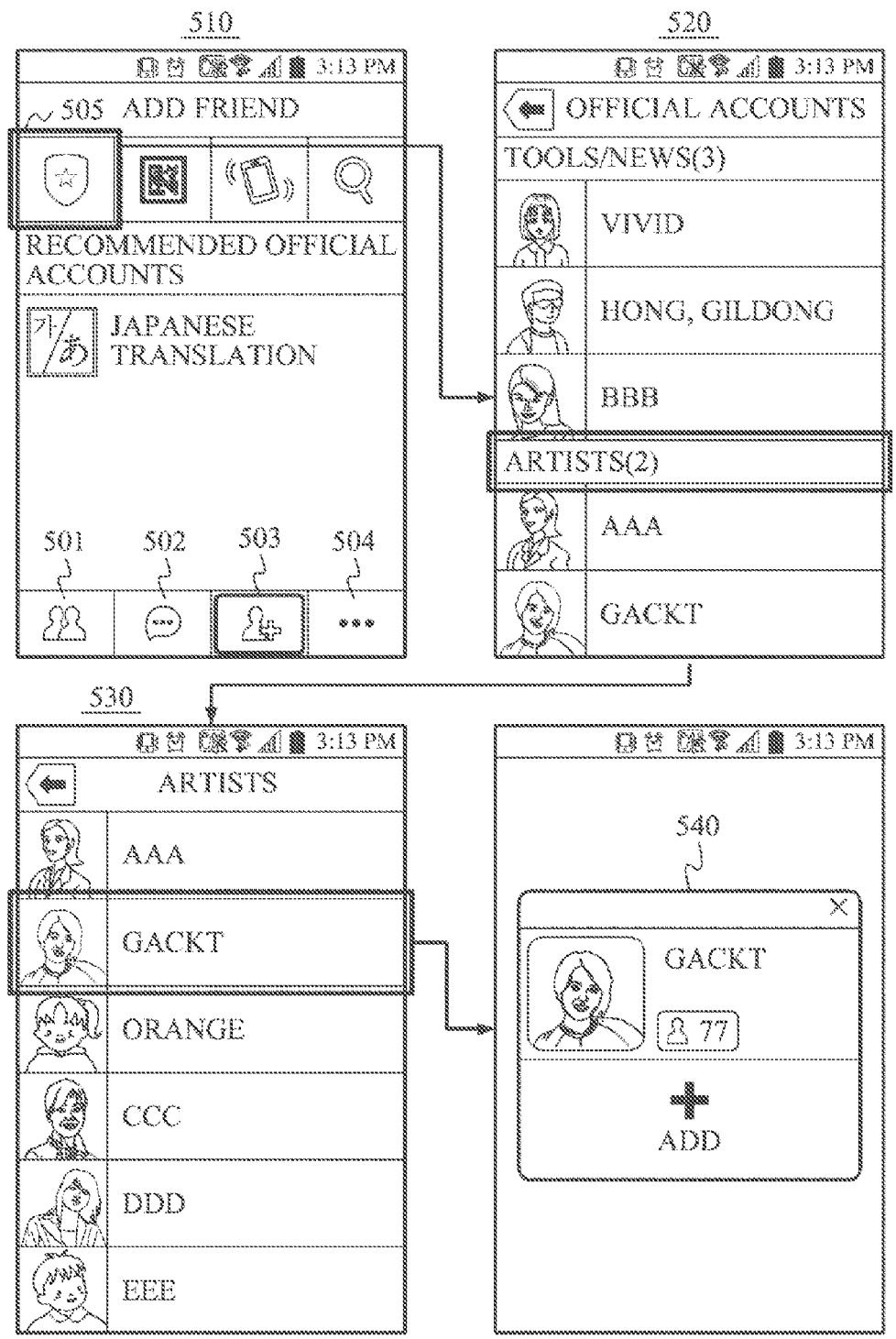
FIG. 5, FIG. 6, FIG. 7, and FIG. 8 are screens illustrating interfaces of users participating in an event with an official account according to exemplary embodiments of the present invention.

Referring to FIG. 5, a messenger screen 510 provided by a messenger platform on a user terminal may include a Friend tab 501 providing a friend list registered in a messenger service 100, a Chat tab 502 providing a friend chat room, a Friend Add tab 503 providing a recommended friend list to add a friend, and a Setup tab 504 providing a general configuration function related to the messenger service 100. The Friend Add tab 503 may include an Official category 505 providing an official account list as a recommended friend list. When a user 102 selects the Official category 505 from the Friend Add tab 503, an official list screen 520 providing an official account list is displayed. The official list screen 520 may provide a classified list of a various accounts, for example, a newly registered account, an artist account, a celebrity account, a brand account, a business account, and a media account. For instance, when the user selects the artist account on the official list screen 520, an artist account screen 530 including an official account list used by artists is displayed. Subsequently, when the user selects a particular artist on the artist account screen 530, a pop up screen 540 in which an add friend button is displayed. When the user selects the add friend button on the pop up screen 540, the artist is registered on a friend list of the user and the user is also registered on a friend list of the artist. In addition to the method of adding an official account via the processes shown in FIG. 5, a search method using an identification (ID) or name or a search method using a Quick Response (QR) code is supported and thus, the user may directly retrieve and add an official account.

Figure 6:
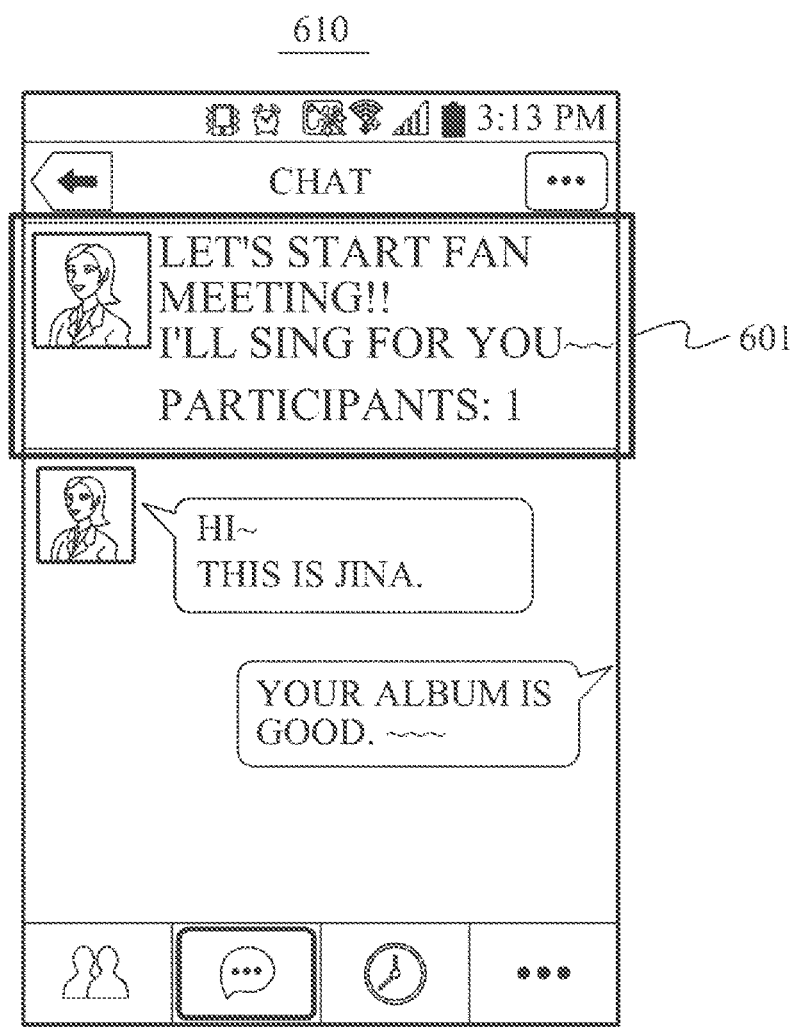
Figure 7:
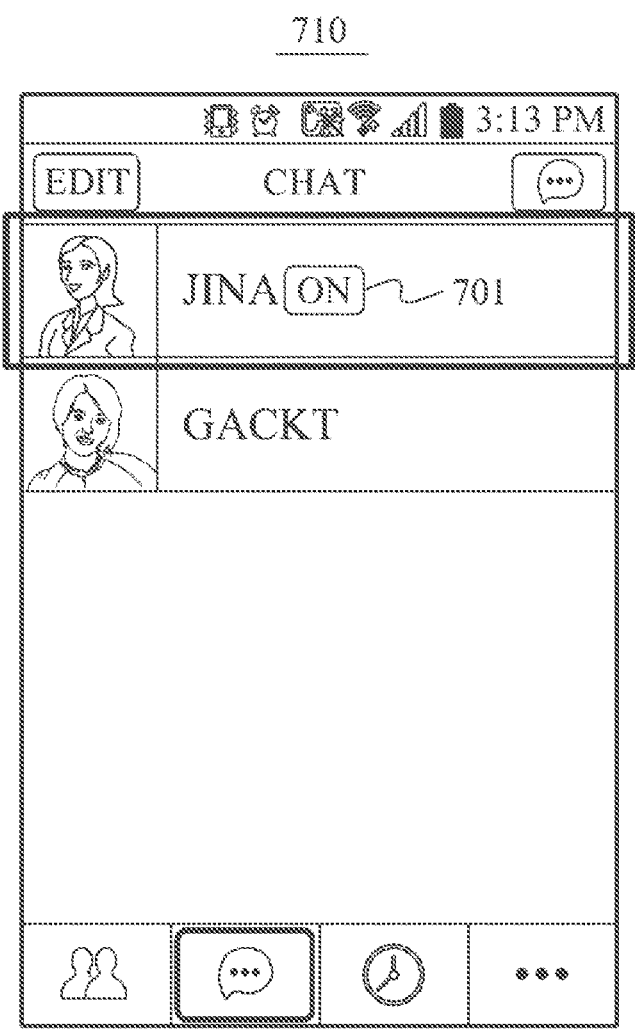
Figure 8:
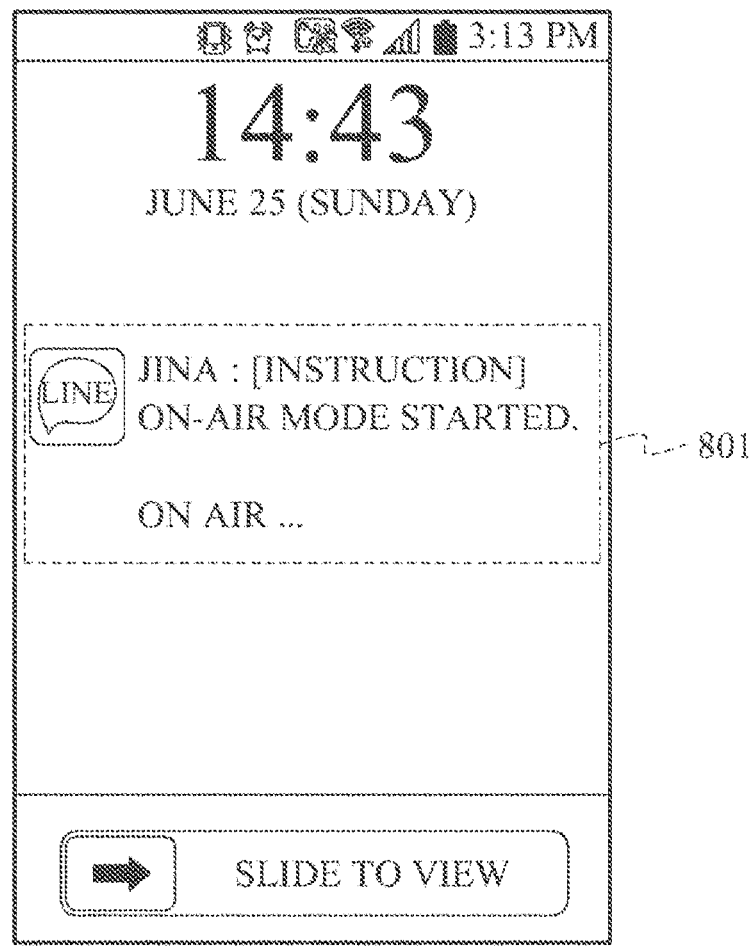

FIG. 6 illustrates a chat room screen 610 displaying a chat between an account involved in an event among official accounts registered on the friend list of the user. On a top portion of the chat room screen 610, event information 601 including a profile image, an event title, a desired number of participants, a number of participants in real time, and a scheduled or expected event finish time may be displayed as on-air information on the event currently in progress. The two-way communication with the user 102 in real time may be possible in the chat room screen 610 only when the event is on-air. As shown in FIG. 7, a chat list screen 710 of the user 102 may display an icon 701 indicating that the account is currently involved in the on-air event while the official account is maintained in the on-air mode. Further, when a new event is started regarding an official account registered on the friend list of the user 102 or a new message is received from the event creator 101, as shown in FIG. 8, event start or message reception is reported through an alarm pop up 801 using a function, such as a push alarm function.

FIG. 9, FIG. 10, FIG. 11, FIG. 12, FIG. 13, FIG. 14, FIG. 15, and FIG. 16 are UI screens provided to an event creator 101 to generate and manage an event according to exemplary embodiments of the present invention. For example, an interface for the event creator 101 is provided in a website connected environment and may include a basic setup screen, a data statistics screen, a message screen, a send account screen, and an on-air mode screen.

Figure 9:
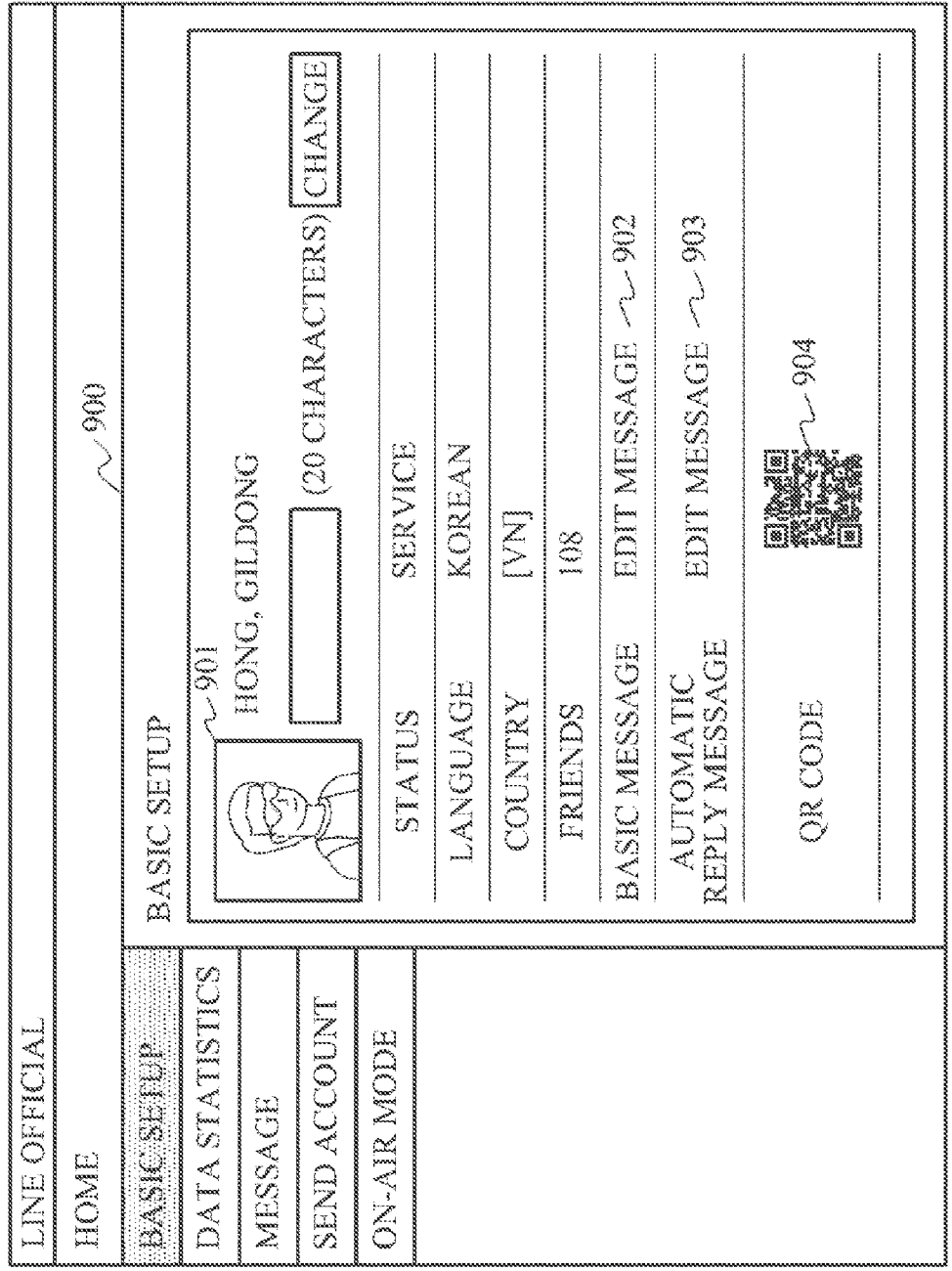

Referring to FIG. 9, the basic setup screen 900 may allow an event creator 101 to input basic information related to an official account. The event creator 101 may input, through the basic setup screen 900, a profile image 901 displayed when the official account is displayed, for example, in a chat room with a user 102, a basic message 902 displayed when a user 102 adds the official account as a friend, an automatic reply message 903 responding to a message sent by a user 102 to the official account, and a QR code 904 used to identify the official account. The basic message 902 and the automatic reply message 903 may be input through various means including, for example a text message, an image, a pictograph, an emoticon and/or a stamp. Further, the basic setup screen 900 may display a current status of the official account, a target language, a desired country, and/or a number of registered friends.

Referring to FIG. 10, the data statistics screen 1000 may display statistical data related to the official account of the event creator 101. The data statistical screen 1000 may provide classified statistical data of a promotion display 1001, an added friend 1002, a sent message 1003, and a received message 1004. The promotion display statistic data 1001 may provide a number of promotion displays to an add friend tab 510 or official list screen 520 in FIG. 5. The add friend statistical data 1002 may provide a number of friends added by the user 102 to the friend list. The sent message statistical data 1003 may provide a number of messages sent by the event creator 101, and the received message statistic data 1004 may provide a number of messages received from the user 102 while the event is on air. This statistical data may be collected for a predetermined period, for example, 1 day, 1 week, or 1 month, or for a period specified by the event creator 101, and may be provided on the data statistics screen 1000 in various forms, for example, as a drawing, chart, or a graph.

Figure 11:
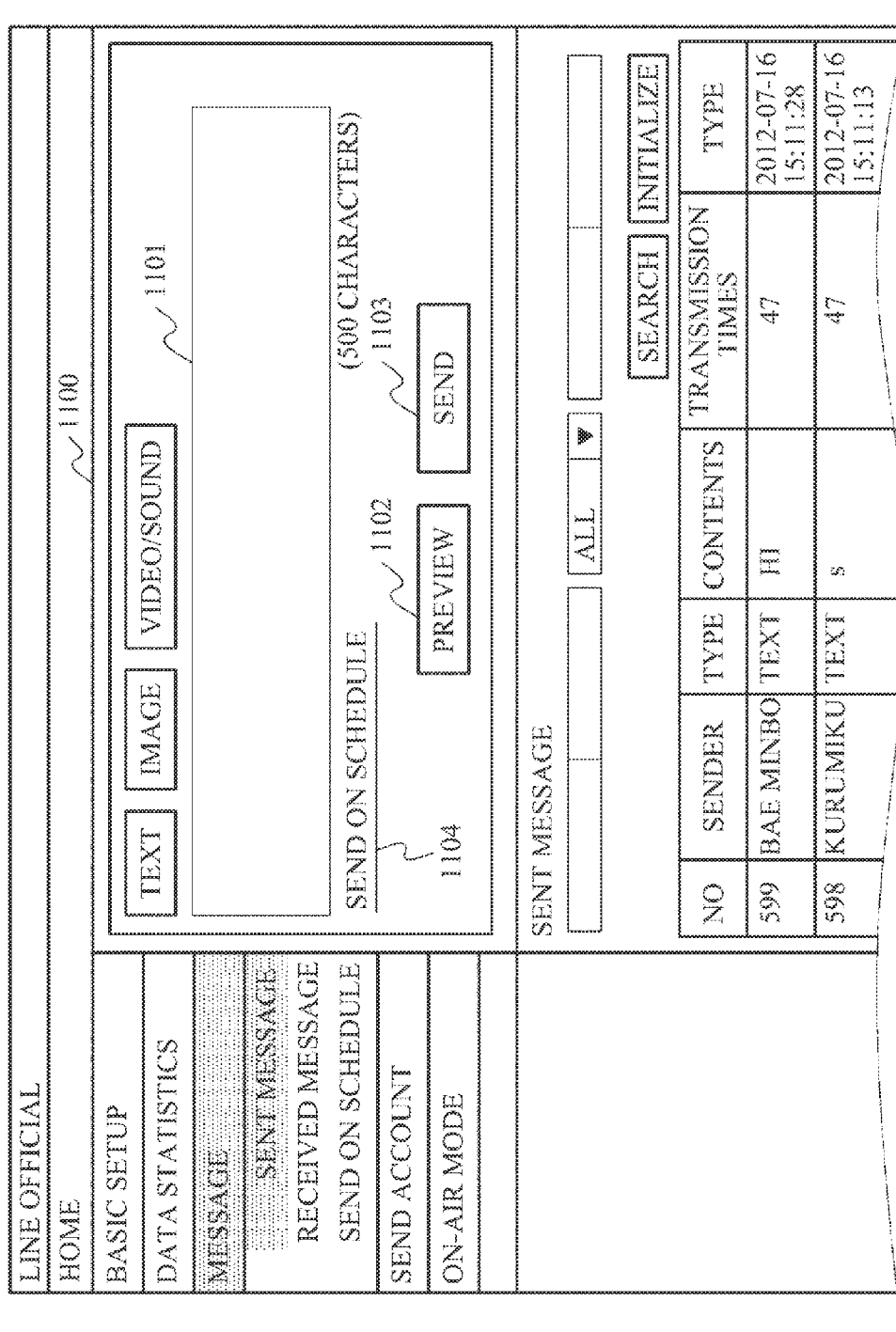

Referring to FIG. 11, the message screen 1110 may provide an interface for the event creator 101 to input an event message to be sent to users 102 participating in an event chat room. The message screen 1100 may provide a message box 1101 to receive input of an event message in various forms, such as a text message, an image, a video, and/or a sound. The method for inputting a text message, image, video, or sound in a terminal are well-known and will therefore not be described in further detail herein. On the message screen 1110, a preview button 1102 may be selected to view the event message input in the message box 1101 prior to sending a message. A send button 1103 may be selected to, in some cases, immediately send the event message input in the message box 1101 to the users 102 participating in the event chat room. In some cases, a send on scheduled button 1104 may be selected by the event creator 101 to input a scheduled time and date at which the event message input in the message box 1101 will be sent. Further, the message screen 1100 may display a sent message list corresponding to messages sent by the event creator 101 and a received message list corresponding to messages received from the user 102 while the event is on air in chronological order.

Figure 12:
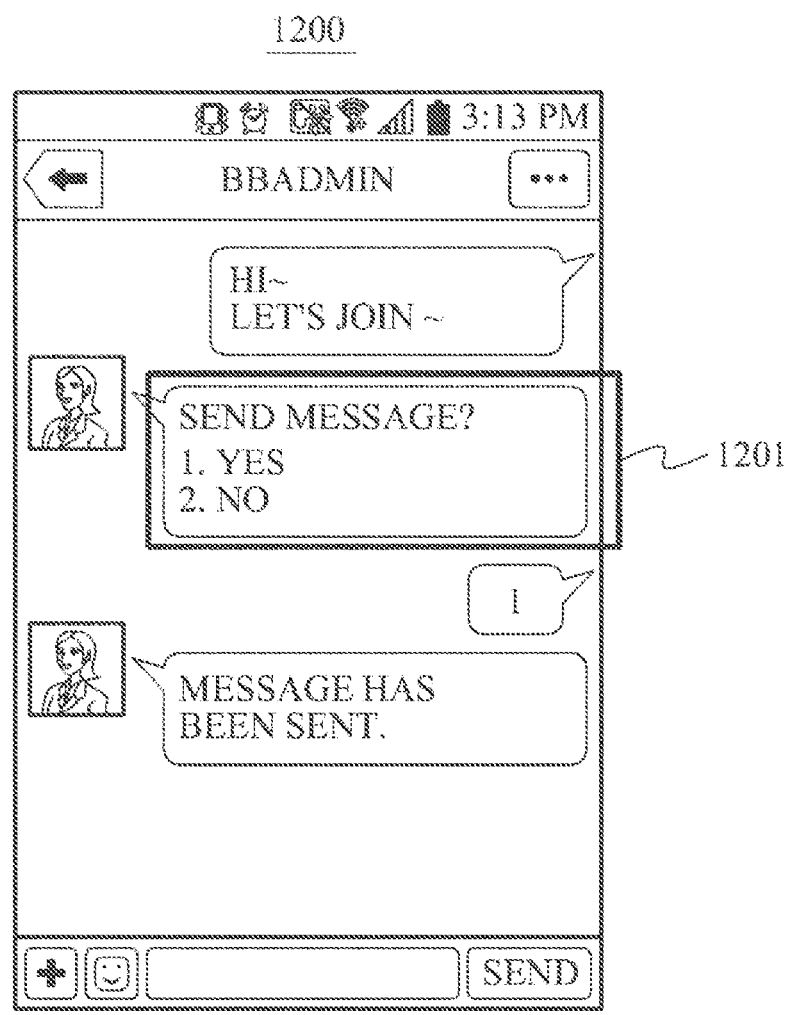

Referring to FIG. 12, while the event is on air, the event creator 101 may also input a message through a chat screen 1200 in a message platform on the terminal. On chat screen 1200, a message in various forms, such as a text message, an image, a stamp, a pictograph, a video, a sound, and/or transmission of a location (e.g., the location of the terminal) may be input. To send the event message in the messenger platform of the terminal, the event creator 101 may support sending the event message via a predetermined authorization process, for example, password authorization. Further, the chat screen 1200 may, in some cases, provide a function of confirming a decision of the event creator 101 to send the message before sending the message through an inquiry 1201 asking about whether to send the input message. In some cases, a message may be sent without seeking confirmation from the event creator 101. The terminal may seek the event creator's confirmation based on settings set by the event creator 101 or by a manufacturer of the terminal.

Figure 13:

Referring to FIG. 13, the send account screen 1300 may enable management of the official account by the event creator 101. The event creator 101 may identify a QR code 1301 representing the official account in a code form through the send account screen 1300. The event creator 101 may transmit the QR code to selected users 102, and the users 102 may add the official account to the users' friend lists using the QR code. Further, the event creator 101 may identify a password 1302 for the official account through the send account screen 1300. The password 1302 may be used for authorization of the event creator 101 when the event creator 101 sends an event message in the messenger platform of the terminal. The send account screen 1300 may also provide a function of changing the password 1302. The password 1302 may be the same as a login password used to access a website of the management service or may be set to a different password from the login password. Further, the send account screen 1300 may provide a confirm before send message function 1303 to set up whether to confirm a decision to send a message in advance when the event creator sends the event message to the users. The confirm before send message function 1303 may allow the event creator 101 to select one or more users 102 for which confirmation to send a message may be needed, or may allow the event creator 101 to apply the same confirmation settings to all users 102.

Figure 15:
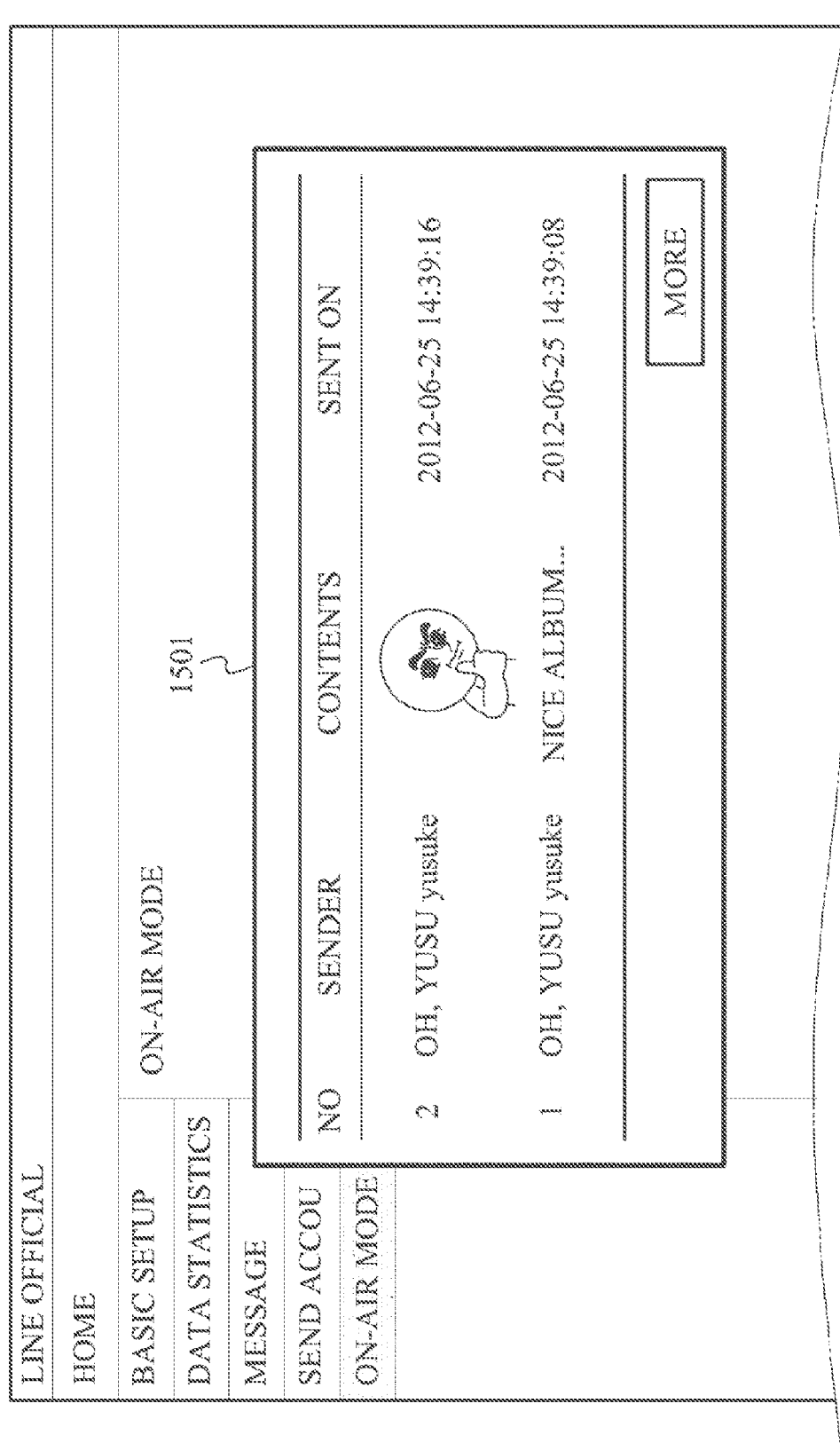

Referring to FIG. 14, the event creator 101 may manage an event list conducted in the event chat room with the official account via on-air mode screen 1400. The on-air mode screen 1400 may, for each event, display event status information, such as an event title 1401, a transmission number 1402 that is a number of event messages sent by the event creator, a reception number 1403 that is a number of reply messages received from users participating in the event chat room, a wanted number 1404 that is a desired number of participants set by the event creator, a participant number 1405 is a number of participants participating in real time a start time 1406 that is a time at which the event starts, and a finish time 1407 that is a time at which the event finishes. When the event creator 101 selects the transmission number 1402 or the reception number 1403 from the on-air mode screen 1400, a layer 1501 displaying a relevant message list, such as an event message list or a reply message list, may be provided as shown in FIG. 15. When the event creator 101 does not designate the wanted number 1404, relevant information may be displayed as '—' on the on-air mode screen 1400. In addition, regarding an event currently in the on-air mode on the event list, an end menu 1408 may be activated and displayed on the on-air mode screen 1400 instead of the finish time 1407. Accordingly, the event end button 1408 is displayed with respect to the event being on air. When the event creator 101 selects the event end button 1408, the event may be forcibly terminated. Further, even though the event creator 101 does not terminate the event, the event may be automatically terminated after a predetermined period of time, for example, 24 hours, from the event start time. The predetermined period of time may be set by the event creator 101.

Moreover, a new broadcast button 1409 may be selected to enable the event creator 101 to create a new event. When the event creator 101 selects the new broadcast button 1409, the on-air mode screen 1400 may switch to a page to create an event. When there is an event currently on air, a message informing the event creator 101 that an event cannot be created, for example, a message "two broadcasts are not allowed at the same time. Try again after finishing the broadcast on air," may be displayed.

Figure 16:
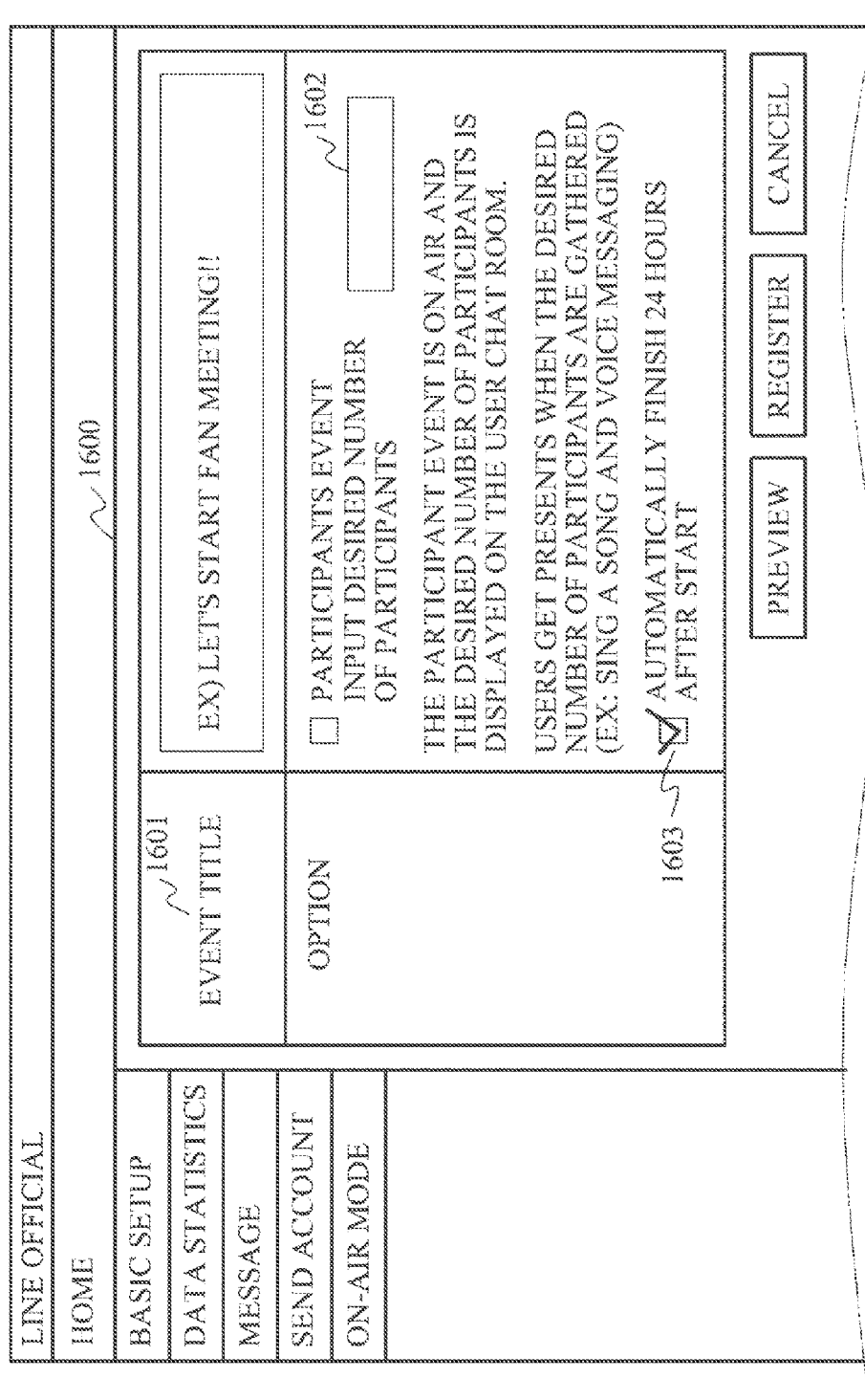

FIG. 16 illustrates a create event screen 1600 to be displayed through the new broadcast menu 1409 on the on-air mode screen 1400 of FIG. 14. The create event screen 1600 may enable the event creator 101 to input new event information as on-air information in the event chat room. The event creator 101 may input information through the create event screen 1600 on a new event, such as an event title 1601, a desired participant number 1602, and an event finish time 1603. When a desired number of participants specified by the event creator 101 in the desired participant number 1602 are gathered, users 102 may receive presents, music, or voice messages from the event creator 101. When the event creator 101 inputs the event finish time 1603, the event may be automatically terminated at the event finish time 1603. When the event creator 101 does not input the event finish time 1603, the event may be maintained in the on-air mode, in some cases, until the event creator 101 selects the event end menu 1408 on the on-air mode screen 1400 of FIG. 14 or, in some cases, after a predetermined time from an event start time has elapsed. The event information, such as the event title 1601, the desired participant number 1602 and the event finish time 1603, input through the create event screen 1600 may be displayed in the event chat room during the on-air mode as shown in FIG. 16.

As described above, the messenger on-air service system may not only generate an event for a plurality of users adding an official account as a friend but may also provide a general management service of the official account, such as management of a plurality of chat rooms generated by the users.

Figure 17:
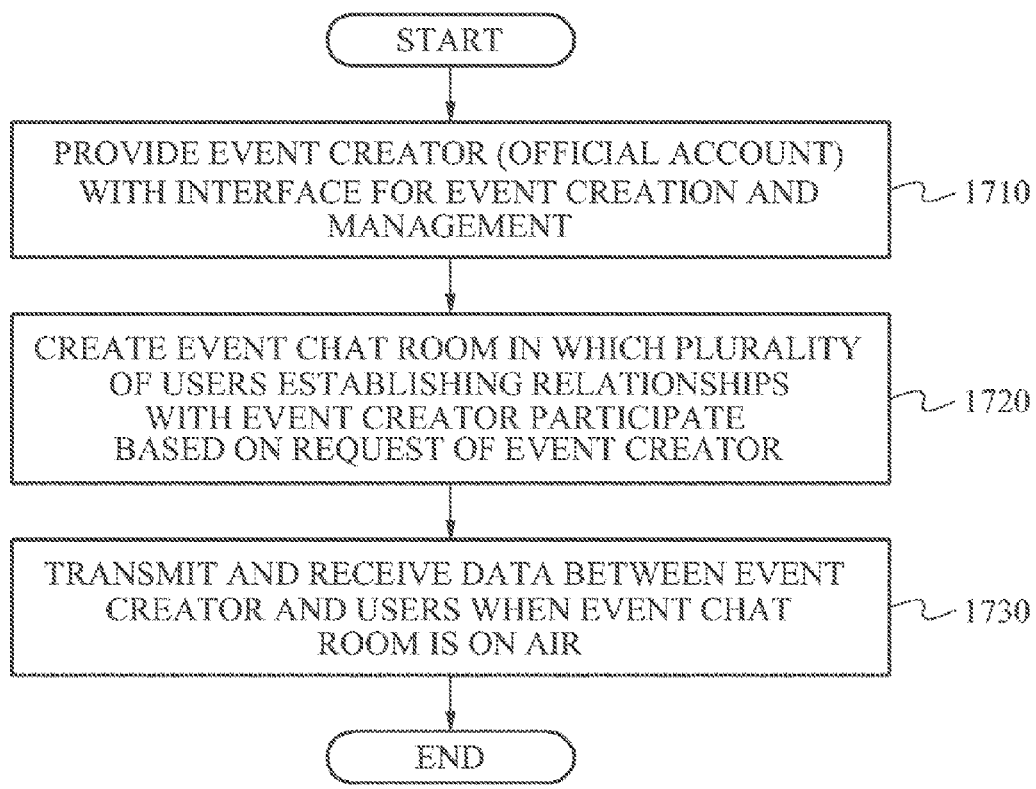
FIG. 17 is a flowchart illustrating a messenger on-air service method for providing an event generation and management service to a plurality of users according to exemplary embodiments of the present invention.

FIG. 17 is a flowchart illustrating a messenger on-air service method for providing an event generation and management service to a plurality of users 102 according to exemplary embodiments of the present invention. Operations of the messenger on-air service method according to exemplary embodiments may be conducted by the messenger on-air service system 100 described with reference to FIG. 1, FIG. 2, FIG. 3, and FIG. 4.

The messenger on-air service system 100 may provide a user 102 using a private account with an interface for friend management and an event creator 101 using an official account with an interface for event creation and management (1710). The interface for the user 102 may be provided in a bot form in a messenger platform of a terminal. The interface, which is a general management service UI for event creation and management, may be supported in a separate website connected environment. Interface functions provided by the messenger on-air service system are the same as those described above with reference to FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16, and thus repeated descriptions thereof will be omitted.

Next, the messenger on-air service system may create an event chat room in which a plurality of users 102 establishing a relationship with the official account of the event creator 101 participate in based on a request of the event creator 101. The messenger on-air service system 100 may establish relationships between the event creator 101 and the users 102, and may register the official account selected by a user 102 on a friends list of the user 102 and also register the private account of the user as a friend of the event creator 101. Accordingly, when the event creator 101 sets up a new event, the messenger on-air service system may create an event chat room with the event creator 101 and the users 102 designated as chatting partners so that the users 102 registered as friends participate in the new event. The messenger on-air service system may create and maintain an independent chat room for each user 102 registering the event creator 101 as a friend. Although an event message written by the event creator 101 is transmitted to the plurality of users 102, each of the user 102 has a separate chat room with the event creator 101. Further, the messenger on-air service system may maintain an on-air mode, in which data transmission and reception is enabled in the created event chat room, for a predetermined time. The on-air mode may be maintained for a predetermined period of time, for example, for 24 hours, may be set automatically at a time when the event is created or by the event creator 101, or the on-air event may be forcibly terminated by the event creator 101 within the predetermined period of time.

The messenger on-air service system 100 may transmit and receive data between the event creator 101 and the plurality of users 102 through the created event chat room when the event chat room is on air (1730). The messenger on-air service system may provide a plurality of channels when the event creator 101 transmits the data to the users 102, and the messenger on-air service system may provide a single channel when a user 102 transmits data to the event creator 101. For instance, data sent by the event creator 101 can be transmitted to all users 102 participating in the event chat room through a plurality of channels, and data sent by one of the users 102 is transmitted only to the event creator 101 through a single channel, and not to the other users 102.

Therefore, although the messenger on-air service system creates a chat room for a participation event with an official account in a messenger and transmits an event message to a plurality of users 102 simultaneously, an independent chat room may be created and managed for each user 102 to have a chat in a separate space, instead of the event creator 101 and the users 102 having a chat in a single community chat room. Moreover, the messenger on-air service system may provide the even creator 101 with the interface environments described with reference to FIG. 9, FIG. 10, FIG. 11, FIG. 12, FIG. 13, FIG. 14, FIG. 15, and FIG. 16 when providing the management service to manage a plurality of chat rooms associated with users 102 participating in the event.

The messenger on-air service method may include simplified operations or additional operations. Further, the operations may be executed in combination of at least two processes and in different orders.

As described above, exemplary embodiments of the invention support a one-to-many message transmission and reception structure using an official account open to all users 102 using a messenger service, thereby providing a user participation event. Further, an independent chat room for each user 102 may be created and managed when an event using the official account is executed and an event message may be sent simultaneously to all users 102 participating in the event whereas a reply message from a user 102 may not be sent to the other users and is only sent to the event creator 101. In addition, the event creator 101 using the official account may be provided with an interface for creation of the event and general management of the official account, thereby effectively managing the plurality of chat rooms associated with the users 102 and having convenience in managing the event and checking transmitted and received messages.

The methods according to the exemplary embodiments of the invention may be recorded in computer-readable media including program instructions to implement various operations embodied by a computer. The computer-readable medium may store program commands, data files, and/or data structures in an independent or combined form. The program command recorded in the computer-readable medium may be a command designed to implement exemplary embodiments of the present invention or a command, publicized to and used by those skilled in a computer software field. The computer-readable medium may include, for example, magnetic media such as a hard disk, a floppy disk, a magnetic tape, an optical recording media such as CD-ROM and DVD, magneto-optical media, and a hardware device, such as ROM, RAM, and flash memory, specially constructed to store and execute a program command. The program command may include, for example, high-level language codes that can be executed by a computer using an interpreter, as well as machine language codes created by a compiler. The hardware device may be constructed to operate as one or more software modules in order to perform the processing according to exemplary embodiments of the present invention. For example, the messenger on-air service system 100 may include a processor for implementing exemplary embodiments of the invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor to provide a messenger on-air service, the method comprising:
   providing, to an event creator, an interface to generate and manage an event,
   automatically recommending an account to a user using the messenger
   according to predetermined user requirements,
   subsequently adding the account as a chatting partner by the user,
   generating, through the interface and using the processor, an event chat room for the event that is created by the event creator for a plurality of users, the plurality of users including the user;
   receiving, by the user, a notice of the event from the account; and transmitting and receiving data for the event creator through the event chat room, wherein the generating the event chat room comprises generating a separate chat room for each of the plurality of users.

2. The method of claim 1, wherein transmitting and receiving the data comprises: sending an event message from the event creator to the plurality of users at the same time; and receiving a reply message from one of the plurality of users in response to the event message, wherein the reply message is not sent to the plurality of users receiving the event message.

3. The method of claim 1, further comprising: maintaining an on-air mode in which data is transmitted and received in the event chat room for a time set automatically or by the event creator.

4. The method of claim 1, further comprising: causing a display, on a screen of the event chat room, of event information comprising at least one of an event title, a desired number of participants, a number of participants in real time, and an event finish time.

5. The method of claim 1, wherein providing the interface comprises: providing, to at least one of the plurality of users, the interface to receive input, from the event creator, of event information comprising at least one of an event title, a desired number of participants, a number of participants in real time, and an event finish time.

6. The method of claim 1, wherein providing the interface comprises: providing the interface to receive input of an event message to be sent to at least one of the plurality of users in a form of at least one of a text message, an image, a video, and a sound.

7. The method of claim 6, wherein providing the interface further comprises: receiving input of a scheduled date and time at which the event message is to be sent through the interface.

8. The method of claim 1, wherein providing the interface further comprises: providing the interface to manage a list of an event message sent by the event creator in the event chat room and a list of a reply message received from at least one of the plurality of users in response to the event message.

9. The method of claim 1, wherein providing the interface comprises: providing the interface to manage an event list executed in the event chat room; and providing event status information comprising at least one of an event title, a number of event messages sent by the event creator, a number of reply messages received from at least one of the plurality of users, a desired number of participants, a number of participants in real time, an event start time, and an event finish time for each event through the interface for managing the event list.

10. The method of claim 9, wherein providing the interface further comprises: providing a list of the event messages or a list of the reply messages when the number of event messages or the number of reply messages is selected by the event creator.

11. The method of claim 1, wherein the transmitting and receiving the data are performed at the separate chat room for each of the plurality of users.

12. A non-transitory computer-readable recording medium comprising instructions, which when executed by a computer system, performs a method comprising:
   providing, to an event creator, an interface to generate and manage an event,
   automatically recommending an account to a user using the messenger according to predetermined user requirements,
   subsequently adding the account as a chatting partner by the user,
   generating, through the interface and using the processor, an event chat room for the event that is created by the event creator for a plurality of users, the plurality of users including the user;
   receiving, by the user, a notice of the event from the account; and
   transmitting and receiving data for the event creator through the event chat room, wherein generating the event chat room comprises generating a separate chat room for each of the plurality of users.

* * * * *